United States Patent
Hasegawa

(10) Patent No.: US 8,090,156 B2
(45) Date of Patent: Jan. 3, 2012

(54) PRINT QUALITY EVALUATION APPARATUS AND METHOD OF PRINT QUALITY EVALUATION

(75) Inventor: Jun Hasegawa, Seongnam-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 980 days.

(21) Appl. No.: 12/034,825

(22) Filed: Feb. 21, 2008

(65) Prior Publication Data

US 2008/0219513 A1     Sep. 11, 2008

(30) Foreign Application Priority Data

Mar. 6, 2007 (KR) ................. 10-2007-0022206

(51) Int. Cl.
   *G06K 9/00* (2006.01)
(52) U.S. Cl. ............................................. 382/112
(58) Field of Classification Search .............. 382/112, 382/319
   See application file for complete search history.

(56) References Cited

U.S. PATENT DOCUMENTS

| | | | |
|---|---|---|---|
| 4,779,106 A | | 10/1988 | Mills |
| 5,285,056 A | | 2/1994 | Tedesco |
| 5,352,878 A | | 10/1994 | Smith |
| 5,404,232 A | * | 4/1995 | Selby ........................ 358/406 |
| 5,510,896 A | | 4/1996 | Wafler |
| 5,555,313 A | * | 9/1996 | Zheng et al. ................. 382/112 |
| 5,877,486 A | * | 3/1999 | Maltsev et al. ........... 235/462.15 |
| 6,036,091 A | | 3/2000 | Spitz |
| 6,141,464 A | * | 10/2000 | Handley ....................... 382/287 |
| 6,244,764 B1 | * | 6/2001 | Lei et al. ...................... 400/103 |
| 6,397,165 B1 | | 5/2002 | Fiekowsky |
| 6,912,071 B1 | | 6/2005 | Rasmussen |
| 2007/0081694 A1 | * | 4/2007 | Ryan ............................ 382/100 |
| 2007/0188781 A1 | * | 8/2007 | Uzawa et al. ................. 358/1.9 |

FOREIGN PATENT DOCUMENTS

| | | |
|---|---|---|
| EP | 0998113 | 5/2000 |
| KR | 1020060061441 | 6/2006 |

OTHER PUBLICATIONS

EP Search Report issued Nov. 9, 2009 in EP Application No. 08151956.3.
Korean Office Action issued Aug. 17, 2011 in KR Application No. 10-2007-0022206.

* cited by examiner

*Primary Examiner* — Matthew Bella
*Assistant Examiner* — Dennis Rosario
(74) *Attorney, Agent, or Firm* — Stanzione & Kim, LLP

(57) ABSTRACT

A method and apparatus to evaluate print quality determines an indicator thereof by measuring a reflectance of printed dots by scanning a medium on which pattern data having a predetermined pattern is printed. The predetermined pattern includes a highlight region and a shadow region. An average of reflectances of the highlight region in the predetermined pattern and an average of reflectances of the shadow region thereof are determined, and a contrast value is determined from a difference between the averages. The indicator is determined from the contrast value. Accordingly, deterioration of print quality that occurs due to a mismatch of a print position is considered, and furthermore, a change in print gradation and a degree of mixing with noise components is also considered in the print quality evaluation.

12 Claims, 12 Drawing Sheets

PRINT QUALITY EVALUATION APPARATUS AND METHOD OF PRINT QUALITY EVALUATION

CROSS-REFERENCE TO RELATED APPLICATIONS

This application claims the benefit of Korean Patent Application No. 10-2007-0022206, filed on Mar. 6, 2007, in the Korean Intellectual Property Office, the disclosure of which is incorporated herein in its entirety by reference.

BACKGROUND OF THE INVENTION

1. Field of the Invention

The present general inventive concept relates to print quality evaluation of a printer, and more particularly, to a method and apparatus to evaluate the print quality and to indicate the evaluation results.

2. Description of the Related Art

Printer resolution is one measure of print quality of a printer and refers to a level of detail that can be achieved when an image is printed on a medium. As a unit of resolution, dots per inch (DPI) generally refers to a density of printed dots, such as those used in halftone printing, that remain distinguishable from neighboring dots, although not necessarily with the naked eye.

In general, conventional operations of measuring the resolution of the printer are described as follows. In order to measure the resolution, pattern data are used that include bar patterns in which a highlight portion and a shadow portion having widths corresponding to each of a plurality of predetermined resolution values are repeated. For example, in a bar pattern corresponding to a resolution of 50 DPI, highlight and shadow bars having a width of 1/50 of an inch are repeated, and in a bar pattern corresponding to a resolution of 600 DPI, highlight and shadow bars having a width of 1/600 of an inch are repeated, as illustrated in FIG. 1. It is to be observed from FIG. 1 that the repetition of the bars at high resolution is not clear to the naked eye.

The pattern data are printed on a medium of the printer so as to be evaluated, and a reflectance is measured by scanning the printed medium using light. Thereafter, an average of reflectances with respect to a direction of a length of the bar pattern is obtained to produce a reflectance profile in a 1D direction. Here, a position of each bar pattern can be identified by its position relative to a position detection marker, as illustrated in FIG. 1. Next, a maximum value and a minimum value of the reflectance profile is calculated for each bar pattern corresponding to each resolution, and a contrast value C is calculated for each bar pattern corresponding to each resolution by using the following equation.

$$C = \frac{R_{max} - R_{min}}{R_{max} + R_{min}} \quad \text{[Equation 1]}$$

Here, $R_{max}$ and $R_{min}$ denote the maximum value and the minimum value of the reflectance profile, respectively.

As described above, a contrast value is calculated for each resolution of the pattern illustrated in FIG. 1, the calculated values are plotted to be compared with a predetermined threshold in order to calculate a resolution limit that is a resolution value at which the calculated contrast value meets the predetermined threshold. Thereafter, the calculated resolution limit is used as an indicator of print quality.

In the conventional method of evaluating print quality, deterioration of print quality that occurs due to a mismatch of a print position caused by printer characteristics or a defect of the printer is not considered. This will be described with reference to FIG. 2.

The left side of FIG. 2 illustrates print results, and the right side thereof illustrates changes in the reflectance according to a print position. An ideal print result is illustrated in (a). In the aforementioned method of evaluating print quality, the contrast value is calculated by using only the maximum value and the minimum value of the reflectance profile in the 1D direction, so that (b) and (c), which represent mismatched print position, and (d), which represents that both a print width and a print position are not correctly printed, have the same contrast value as that of the ideal print result (a). As a result, the print quality of mismatched patterns is evaluated to be the same as an ideal print pattern.

FIG. 3 is a view to explain another problem of the conventional method of evaluating print quality. Similar to FIG. 2, the left hand portion illustrates a print result, and the right hand portion illustrates a change in reflectance according to a print position. In the conventional method of evaluating print quality, the contrast value is calculated using only the maximum value and the minimum value of the reflectance profile in the 1D direction, so that (b), which represents a change in print gradation, and (c), which represents mixing noise components to the ideal profile (a), have the same contrast value as that of the ideal profile (a). Therefore, although there is a change in print gradation and mixing with noise components, print quality may be inaccurately evaluated.

SUMMARY OF THE INVENTION

The present general inventive concept provides a method and apparatus to evaluate print quality in consideration of deterioration of print quality which occurs due to a mismatch of a print position. The present general inventive concept provides a computer-readable medium having embodied thereon a computer program to execute the method. Furthermore, the present general inventive concept also provides a method and apparatus to evaluate print quality in consideration of a change in print gradation or mixing with noise components and a computer-readable medium having embodied thereon a computer program to execute the method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a method of evaluating print quality, the method including measuring a reflectance of printed dots by scanning a medium on which the dots are printed according to pattern data having a predetermined pattern of a highlight region and a shadow region, determining an average of reflectances of the highlight region in the predetermined pattern and an average of reflectances of the shadow region thereof, determining a contrast value from the average of the reflectances of the highlight region and the average of the reflectances of the shadow region, and determining an indicator of the print quality from the contrast value.

The method may include classifying pixels respectively assigned a value corresponding to a reflectance of a corresponding one of the printed dots from the scanning thereof as associated with the dot in the highlight region or the shadow region of the predetermined pattern.

The classifying of the pixels may include determining a position of each of the pixels, the pixels being classified into the highlight region and the shadow region in the predetermined pattern on the basis of the position of each of the pixels.

The classifying of the pixels may include mapping a scan image formed from the pixels based on the measured reflectance onto an image formed directly from the pattern data.

The predetermined pattern may include a plurality of bar patterns in which the highlight region and the shadow region have widths corresponding to a plurality of predetermined resolution values, the contrast values being determined from each of the bar patterns.

The determining of the indicator may include determining thresholds of each of the bar patterns from a distribution of reflectances of the highlight region and a distribution of reflectances of the shadow region, and determining a resolution limit as the indicator from a comparison of the contrast values and the thresholds.

The determining of the indicator may also include detemining thresholds of each of the bar patterns from a distribution of reflectances of the highlight region and a distribution of reflectances of the shadow region, determining a resolution limit from the contrast values and the thresholds, and integrating an area defined by an adjusted contrast value which is obtained by subtracting a contrast value corresponding to the resolution limit from the contrast value of each of the bar patterns, the integrated area being established as the indicator.

The thresholds may be determined by performing a Welch's test or a t-test, and the thresholds may be determined according to an input significant level.

The determining of the indicator may include integrating an area defined by the contrast values as the indicator.

The foregoing and/or additional aspects and utilities of the present general inventive concept may also be achieved by a computer-readable medium having embodied thereon computer instructions that, when executed by a computer, perform a method of evaluating print quality including assigning a reflectance to pixels as measured by scanning a medium on which pattern data having a predetermined pattern is printed, the predetermined pattern having a highlight region and a shadow region, determining an average of reflectances of the highlight region in the predetermined pattern and an average of reflectances of the shadow region thereof, determining a contrast value from a difference between the calculated averages, and determining an indicator of the print quality from the contrast value.

The foregoing and/or other aspects and utilities of the present general inventive concept may also be achieved by an apparatus to evaluate print quality including a scanner to obtain a reflectance of printed dots and to assign the reflectance to at least one pixel in a scan image, the dots printed in according to pattern data having a predetermined pattern of a highlight region and a shadow region, a contrast determining unit to determine an average of reflectances of the highlight region in the predetermined pattern and an average of reflectances of the shadow region thereof, and to determine a contrast value from a difference between the calculated averages, and an indicator determining unit to determine an indicator of the print quality from the contrast value.

The apparatus may include a pixel classifier to classify the pixels as being from the highlight region or the shadow region of the predetermined pattern.

The apparatus may include a position determining unit to determine a position of each of the pixels in relation to a position of the corresponding dot in the predetermined pattern, wherein the pixel classifier classifies pixels as being from the highlight region or the shadow region in the predetermined pattern from the determined position of each of the pixels.

The pixel classifier may classify the pixels into the highlight region and the shadow region of the predetermined pattern by mapping the scan image of the measured reflectance onto an image formed directly from the pattern data.

The predetermined pattern may include a plurality of bar patterns in which the highlight region and the shadow region have widths corresponding to a plurality of predetermined resolution values, the contrast determining unit determining the contrast values corresponding to each of the bar patterns.

The indicator determining unit may include a threshold determining unit to determine thresholds of each of the bar patterns from a distribution of reflectances of the highlight region and a distribution of reflectances of the shadow region, and a resolution limit determining unit to determine a resolution limit as the indicator of the print quality from the contrast values and the determined thresholds.

The indicator determining unit may include a threshold determining unit to determine thresholds of each of the bar patterns from a distribution of reflectances of the highlight region and a distribution of reflectances of the shadow region a resolution limit determining unit to determine a resolution limit from a comparison of the contrast values and the determined thresholds, and an area determining unit to integrate an area based defined by a plurality of adjusted contrast values obtained by subtracting a contrast value corresponding to the resolution limit from the contrast value of each of the bar patterns, the area being established as the indicator of the print quality.

The threshold determining unit may determine the thresholds by using a Welch's test or a t-test and the threshold determining unit may determine the thresholds according to an input significant level.

The indicator determining unit may include an area determining unit to integrate an area defined by the contrast values as the indicator of the print quality.

The foregoing and/or other aspects and utilities of the present general inventive concept may also be achieved by providing a method of evaluating print quality of a printer including printing on the printer pattern data of a plurality of dot patterns each having a contrast respectively defined by a plurality of print resolutions, measuring the contrast in each of the dot patterns of the printed pattern data, and determining the print quality from a distribution of the measured contrast from each of the printed dot patterns.

The foregoing and/or other aspects and utilities of the present general inventive concept may also be achieved by providing a method of evaluating print quality including scanning a printed pattern corresponding to an ideal shading model provided to a printer, determining a contrast level in the scanned pattern at which a difference in measured values in printed and non-printed regions of the ideal shading model remain statistically significant to a predetermined significance level, and providing an indicator of the print quality corresponding to the contrast level.

The foregoing and/or other aspects and utilities of the present general inventive concept may also be achieved by providing an apparatus to evaluate print quality of a printer including a scanner to form a scan image of pixels containing measurement data of pattern data printed by the printer, a pixel identifier to determine respective positions of the pixels in the scan image and to determine from the positions whether a pixel contains the measurement data of a printed region or a non-printed region of the pattern data, and an output device to provide an indicator of the print quality corresponding to a contrast value in the scan image at which a difference in the measurement data in the printed and the non-printed regions of the pattern data remains statistically significant to a predetermined significance level.

The foregoing and/or other aspects and utilities of the present general inventive concept may also be achieved by providing an apparatus to evaluate print quality of a printer including a storage unit having stored therein an image of pixels containing measurement data of printed pattern data corresponding to an ideal shading model, and a print quality evaluator to determine a maximum print quality from a difference in respective averages of the measurement data corresponding to printed and non-printed regions of the ideal shading model that remains statistically significant to a predetermined significance level.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
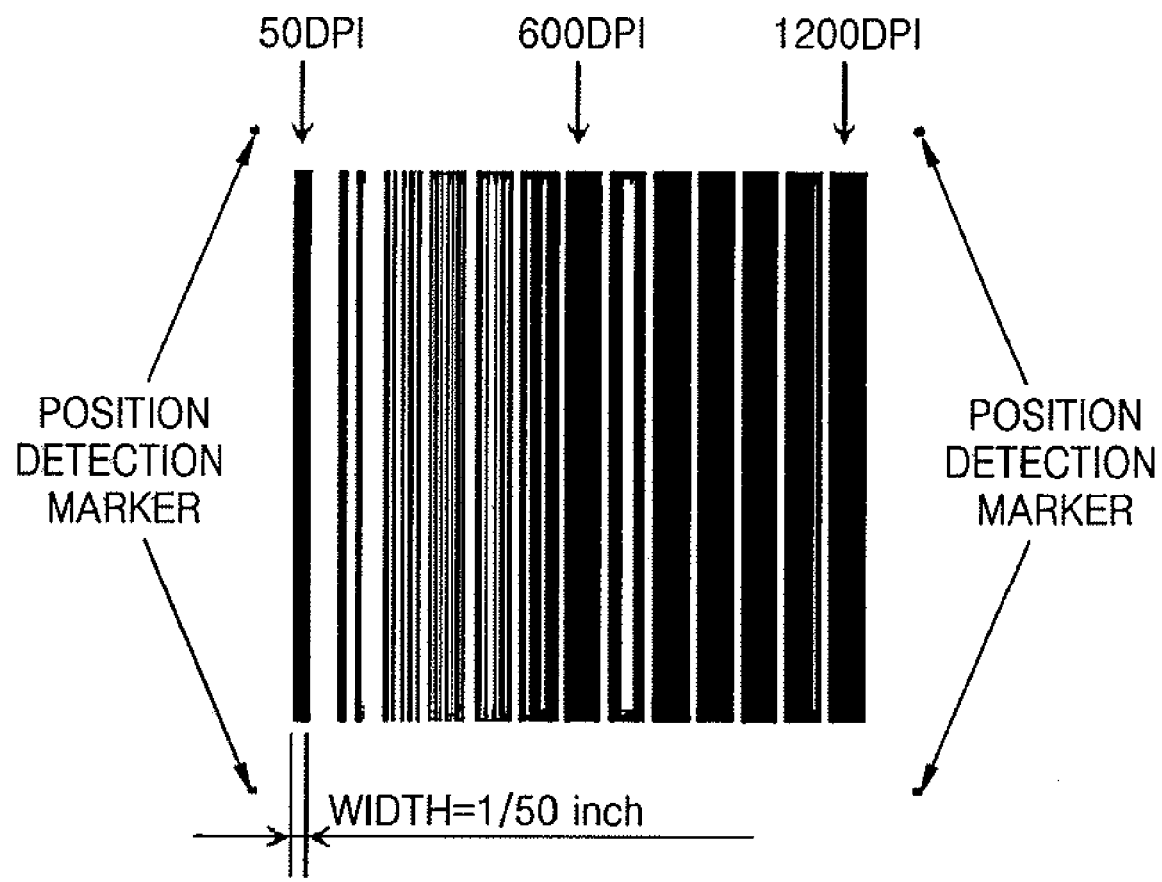
FIG. 1 illustrates an example of pattern data used to measure a resolution of a printer.
Figure 2:
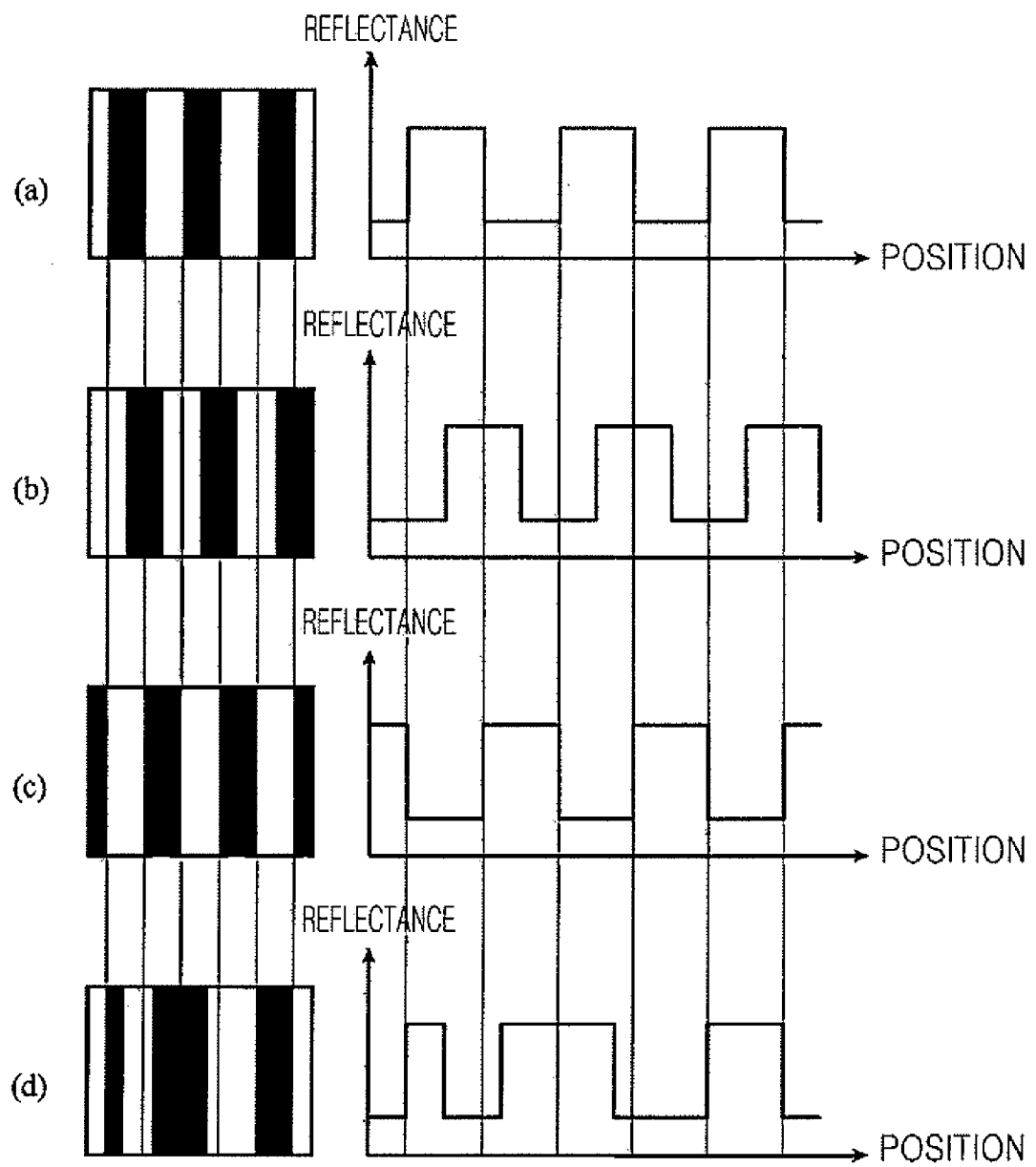
FIG. 2 illustrates problems with conventional methods of evaluating print quality.
Figure 3:
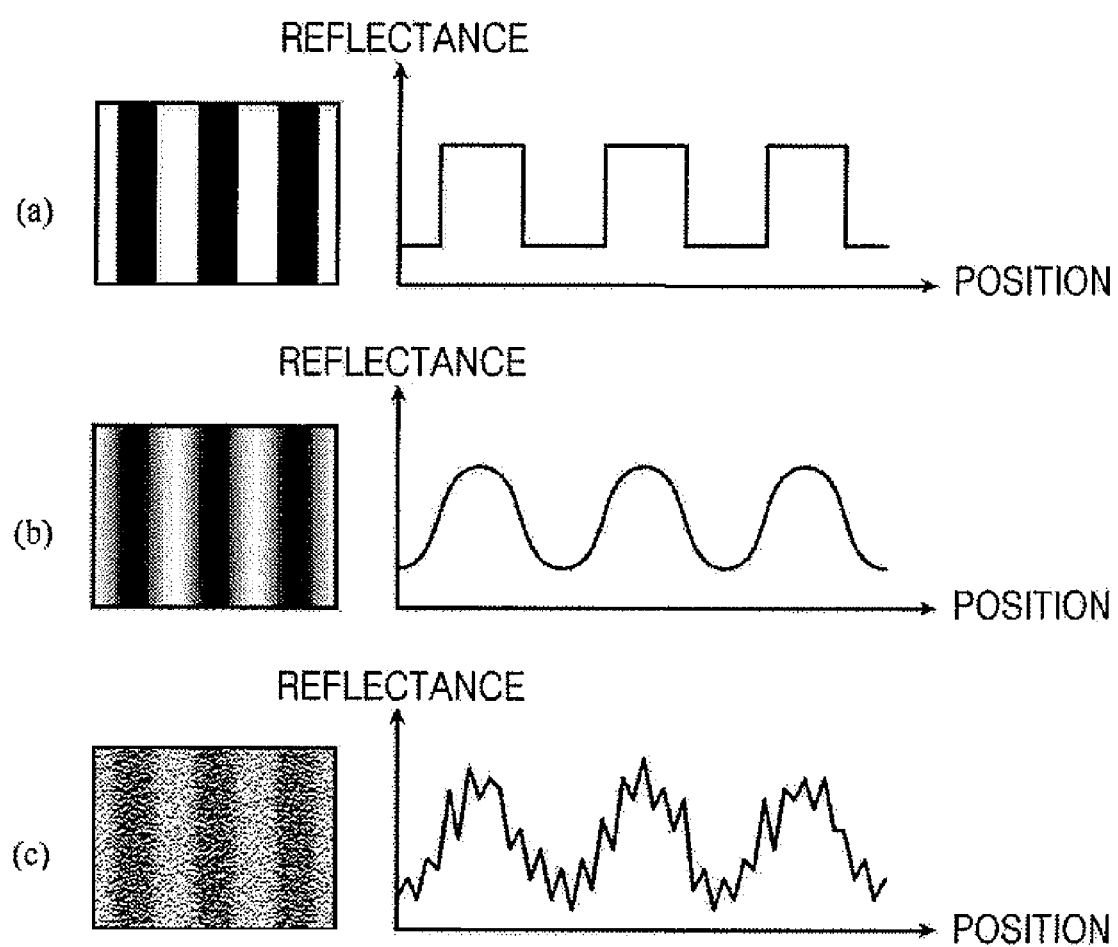
FIG. 3 illustrates additional problems with conventional methods of evaluating print quality.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 4:
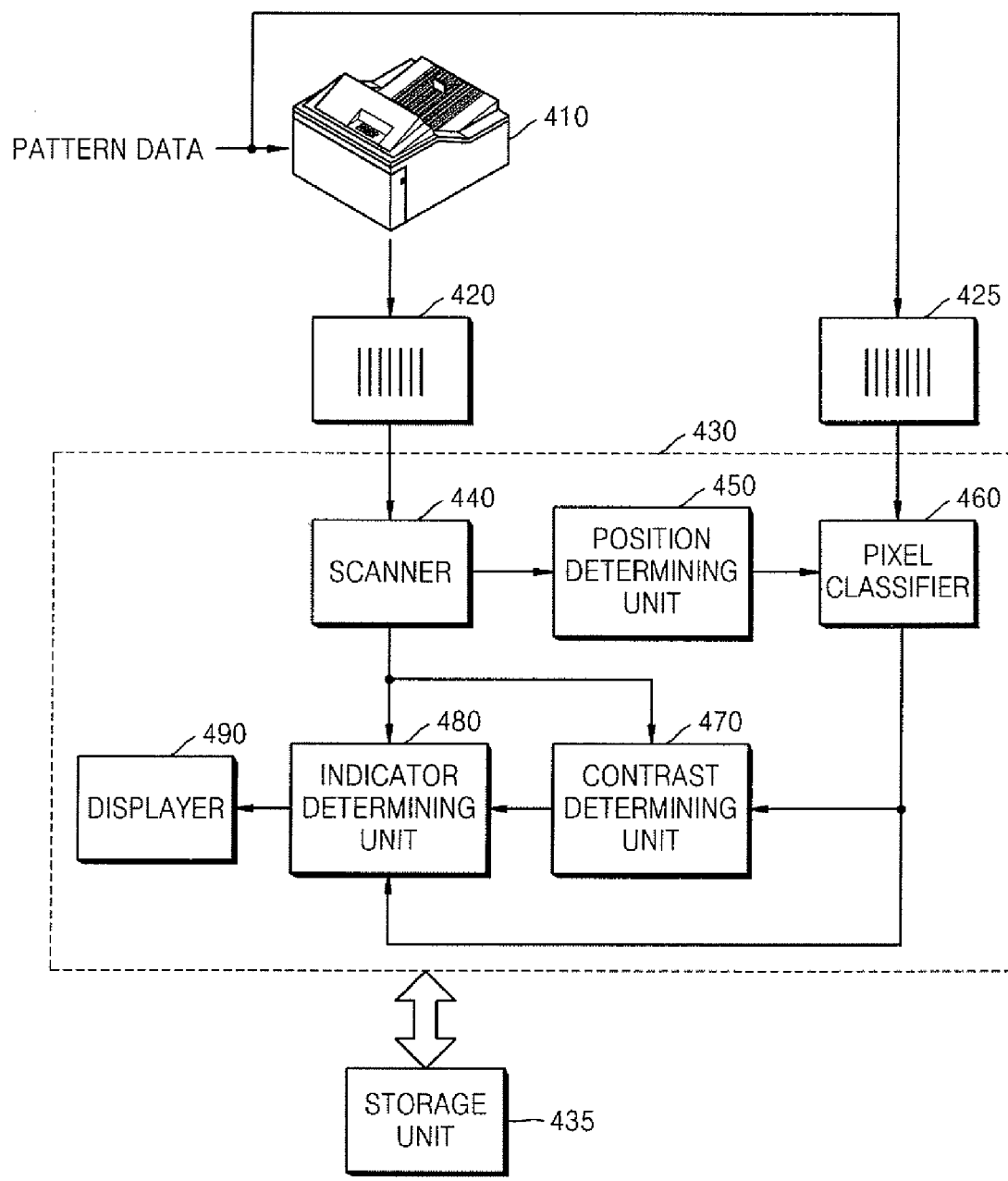
FIG. 4 is a block diagram illustrating an apparatus to evaluate print quality according to an embodiment of the present general inventive concept.

FIG. 4 illustrates a block diagram of an apparatus to evaluate print quality according to an embodiment of the present general inventive concept. Referring to FIG. 4, a print quality evaluation apparatus 430 according to the current embodiment includes a scanner 440, a position determining unit 450, a pixel classifier 460, a contrast determining unit 470, an indicator determining unit 480, and a displayer 490.

The exemplary system illustrated in FIG. 4 may be implemented in hardware, software, or a combination of both. For example, certain components, such as the position determining unit 450, the pixel classifier 460, the contrast determining unit 470, and the indicator determining unit 480 may be suited to be realized as processor instructions executing in one or more computer execution threads on one or more processors. Each of those functional components may be implemented on a dedicated processor, or may be executed on a single processor. Alternatively, each component illustrated in FIG. 4 may be realized in one or more application specific circuits. The present general inventive concept may be embodied through numerous configurations other than that illustrated in FIG. 4 without deviating from the spirit and intended scope thereof.

Figure 11:
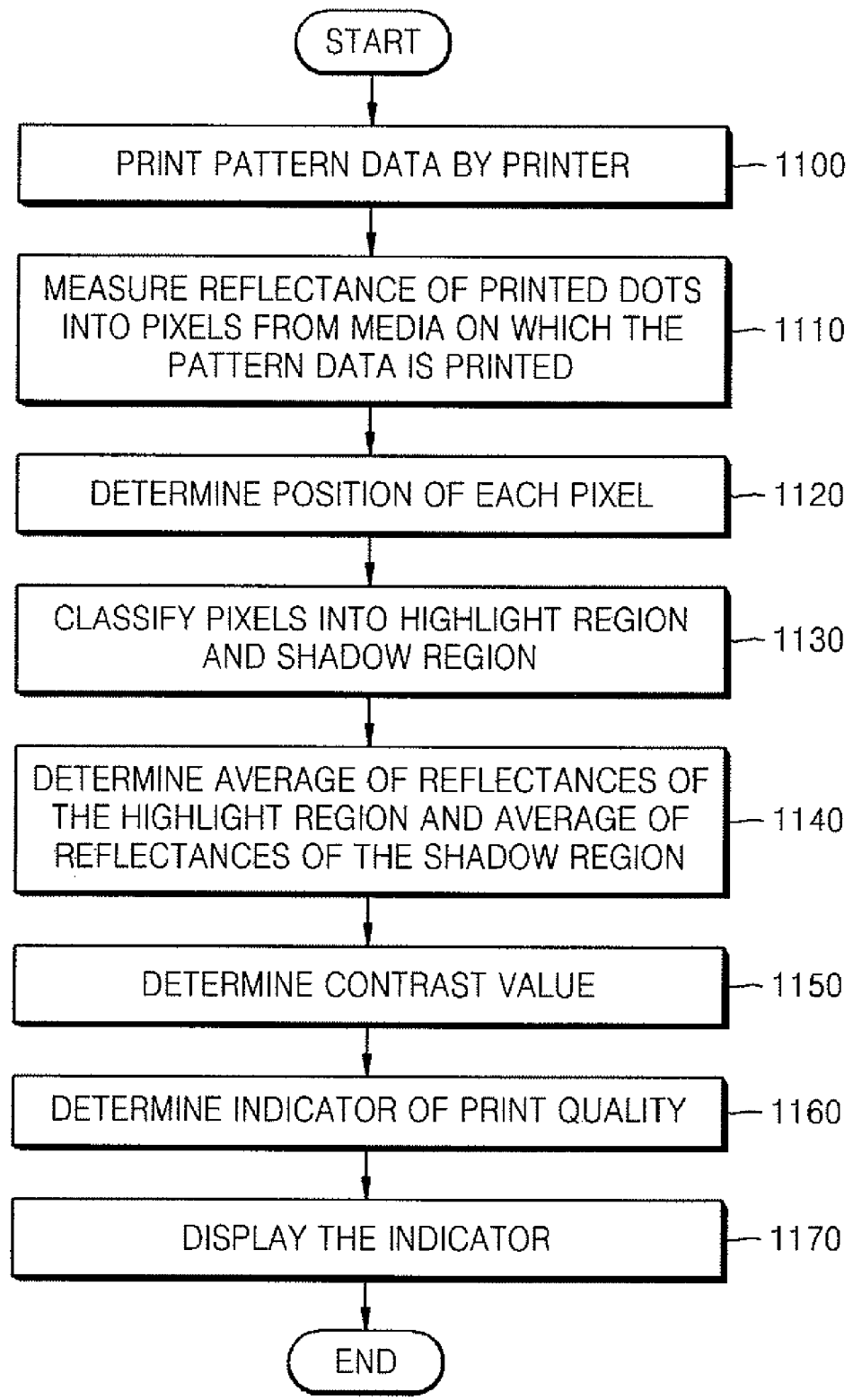
FIG. 11 is a flowchart of a method of evaluating print quality according to an embodiment of the present general inventive concept.

The apparatus 430 of FIG. 4 will now be described with reference to FIG. 11 illustrating a flowchart of a method of evaluating print quality according to an embodiment of the present general inventive concept.

According to the current embodiment, the print quality evaluation apparatus 430 determines a contrast value for each bar pattern printed at each corresponding print resolution of the pattern data, such as illustrated in FIG. 1. It is to be understood that the regions of the print data need not be in bars, as illustrated in FIG. 1, and numerous print data configurations may be used with the present general inventive concept. The apparatus 430 may determine an indicator of print quality using the determined contrast values.

The pattern data may include bar patterns in which a highlight portion and a shadow portion alternate and have widths corresponding to each of the predetermined resolution values, such as illustrated in FIG. 1. The pattern data is input to a printer 410 that is to be evaluated, and the printer 410 prints the pattern data on a medium 420 (operation 1100).

The exemplary scanner 440 obtains evaluation data of the printed pattern data and forms a data structure for further evaluation. For example, if the scanner 410 is implemented in an optical scanner, the scanner 410 scans the medium 420 using light, and measures a reflectance of each of the printed dots in the printed pattern data and assigns the measured reflectance value in a corresponding pixel to form a scan image of reflectance data (operation 1110). For purposes of description and not limitation, the scanner 410 will be described as an optical scanner that obtains reflectance measurements of the printed pattern. It is to be understood, however, that other techniques and mechanisms to obtain measurement data of the printed pattern may be utilized in embodiments of the present general inventive concept without deviating from the spirit and intended scope thereof.

The exemplary position determining unit 450 determines a position of each pixel in the scan image of the reflectance data (operation 1120). For example, the position determining unit 450 can determine the position of each pixel on the basis of coordinates of a position marker of the pattern data, such as illustrated in FIG. 1.

The exemplary pixel classifier 460 classifies pixels of the scan image as having measurement data of a printed dot from a highlight region or a shadow region of the printed pattern data (operation 1130).

In certain embodiments of the present general inventive concept, the print quality evaluation apparatus 430 is in data communication with a storage unit 435 to store scan images and the ideal shading model. The storage unit may also store processor instructions that are executed by a processor to implement software functional modules of the print quality evaluation apparatus 430.

Figure 5:
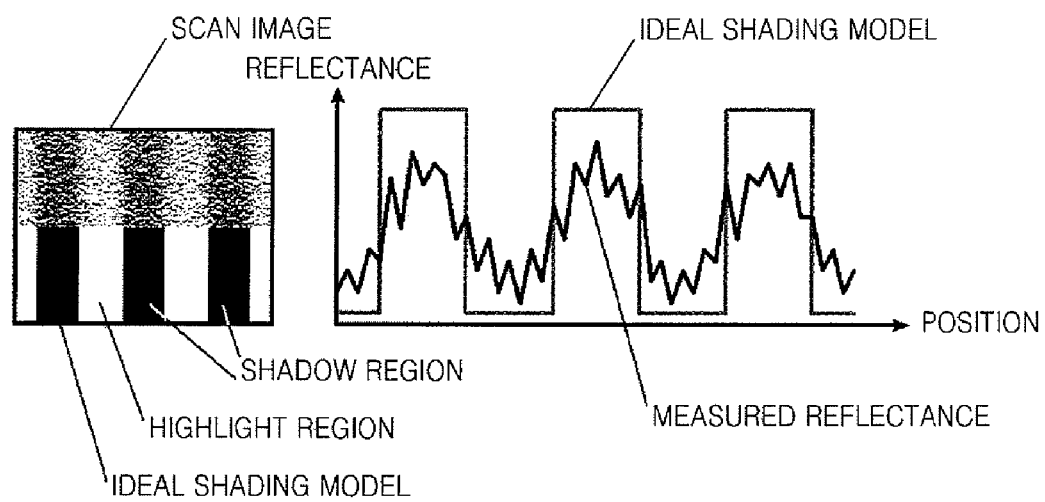
FIG. 5 illustrates a reflectance profile according to a result and a position of mapping a scan image and an ideal shading model.

An exemplary embodiment of a method of classifying pixels will now be described. The pixel classifier 460 may have information on the pattern data or information on the highlight region and the shadow region of the pattern according to the pattern data, and may map the scan image of the reflectance data onto an image 425 formed directly from the information on the pattern data from, for example, the coordinates of the position marker and the position of each of the pixels. Hereinafter, the image 425 formed directly from the information on the pattern data, as opposed to being printed on the printer, will be referred to as an "ideal shading model." The left side of FIG. 5 illustrates a result of an exemplary mapping of the scan image onto the ideal shading model. By such a mapping of the scan image onto the ideal shading model, pixels of the scan image are classified into the highlight region and the shadow region of a pattern according to the pattern data. The right side of FIG. 5 corresponds to measured reflectance and a difference thereof with a reflectance of the ideal shading model according to the respective positions of the pixels. Referring to the graph, the reflectance of the ideal shading model is an ideal value based on the information on the pattern data and may have a fixed value in each of the highlight region and the shadow region. On the other hand, the measured reflectance values fall between the two values of the reflectance of the ideal shading model and vary, rather than being constant, according to position in the highlight region or the shadow region.

The contrast determining unit 470 may determine an average of reflectances of the pixels of the highlight region and the shadow region that are classified by the pixel classifier 460 (operation 1140), and may determine a contrast value from a difference between the averages (operation 1150). Here, the contrast determining unit 470 determines a contrast value of each bar pattern corresponding to each resolution of the pattern data. In the following, operations to determine a contrast value of a bar pattern corresponding to a one particular resolution are described, and operations of determining a contrast value of a bar pattern corresponding to another resolution are performed similarly.

First, an average $\overline{R}_0$ of reflectances of the shadow region and an average $\overline{R}_1$ of reflectances of the highlight region may be calculated through, for example, the equations below. Subscripts 0 and 1 in the equations used herein denote values associated with the shadow region and the highlight region, respectively, and $n_0$ and $n_1$ denote the respective numbers of pixels used to obtain averages of the reflectances of the shadow region and the highlight region, respectively.

$$\overline{R}_0 = \frac{1}{n_0} \sum_{i \in \Omega_0} R(x_i, y_i) \quad \text{[Equation 2]}$$

$$\overline{R}_1 = \frac{1}{n_1} \sum_{j \in \Omega_1} R(x_j, y_j) \quad \text{[Equation 3]}$$

Here, R(x, y) denotes a reflectance at pixel coordinates (x, y), $\Omega_0$ denotes a set of pixels included in the shadow region, and $\Omega_1$ denotes a set of pixels included in the highlight region. It is to be understood that the equations set forth herein mathematically illustrate various exemplary computational methods, the full implementations of which may be carried out as programmed instruction sets executed on a suitable processor.

Then, the contrast determining unit 470 may calculate a contrast value using a difference between the average of reflectances of the highlight region and the average of reflectances of the shadow region. For example, the contrast value $C_t$ can be calculated by using the following equations.

$$C_i = k \cdot |\overline{R}_1 - \overline{R}_0| \cdot 100 \quad \text{[Equation 4]}$$

$$k = \frac{1}{|R_{PaperWhite} - R_{SolidBlack}|} \quad \text{[Equation 5]}$$

Here, $R_{SolidBlack}$ denotes a reflectance in a portion having a highest print density obtained by the printer that is to be evaluated, and $R_{PaperWhite}$ denotes a reflectance of a print paper.

In Equation 4, k is a constant, and may use a value obtained by Equation 5. In Equation 4, k from Equation 5 may be multiplied to normalize the contrast value according to the maximum contrast of the printer for which print quality is to be evaluated, and is multiplied by 100 in order to represent the contrast value as a percentage of the maximum contrast achievable by the printer being evaluated.

According to the current embodiment, unlike certain conventional methods of calculating the contrast value from the maximum value and the minimum value of the reflectance profile in a 1D direction, pixels are classified into the highlight region and the shadow region of the pattern corresponding to the pattern data, and the contrast value may be calculated from a difference between averages of the reflectances of each region. Thus, the contrast value in may indicate deterioration of print quality that occurs due to a mismatch of a print position, and furthermore, the contrast value may also indicate a change in print gradation and a degree of mixing with noise components.

The exemplary indicator determining unit 480 determines an indicator of print quality from the contrast values calculated by the contrast determining unit 470 (operation 1160). In certain embodiments of the present general inventive concept, the contrast values calculated by the contrast determining unit 470 may themselves be used as an indicator of print quality. A detailed block diagram of the indicator determining unit 480 is described below.

The displayer 490 displays the indicator determined by the indicator determining unit 480 on, for example, a screen (operation 1170). The displayer 490 may display a number corresponding to the calculated indicator, or may compare the determined indicator with a reference value to display a print quality grade according to a predetermined standard. The indicator may also be displayed in a graph.

Figure 6:
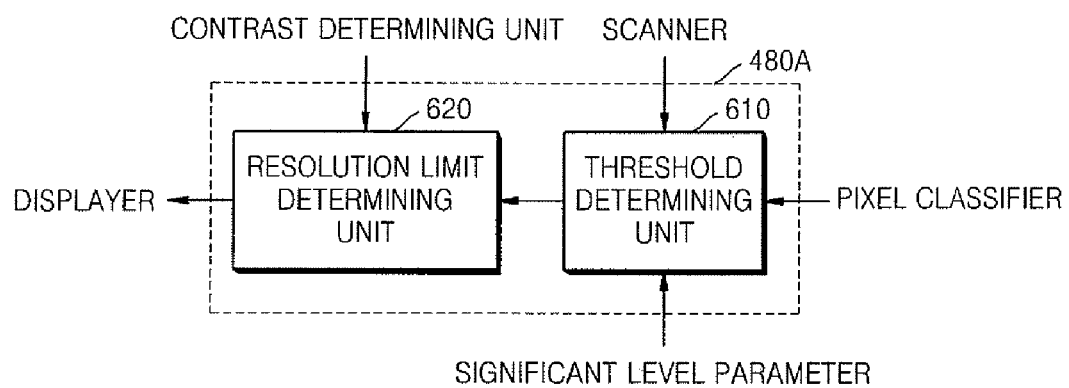
FIG. 6 is a detailed block diagram illustrating an indicator determining unit according to an embodiment of the present general inventive concept.
Figure 12:
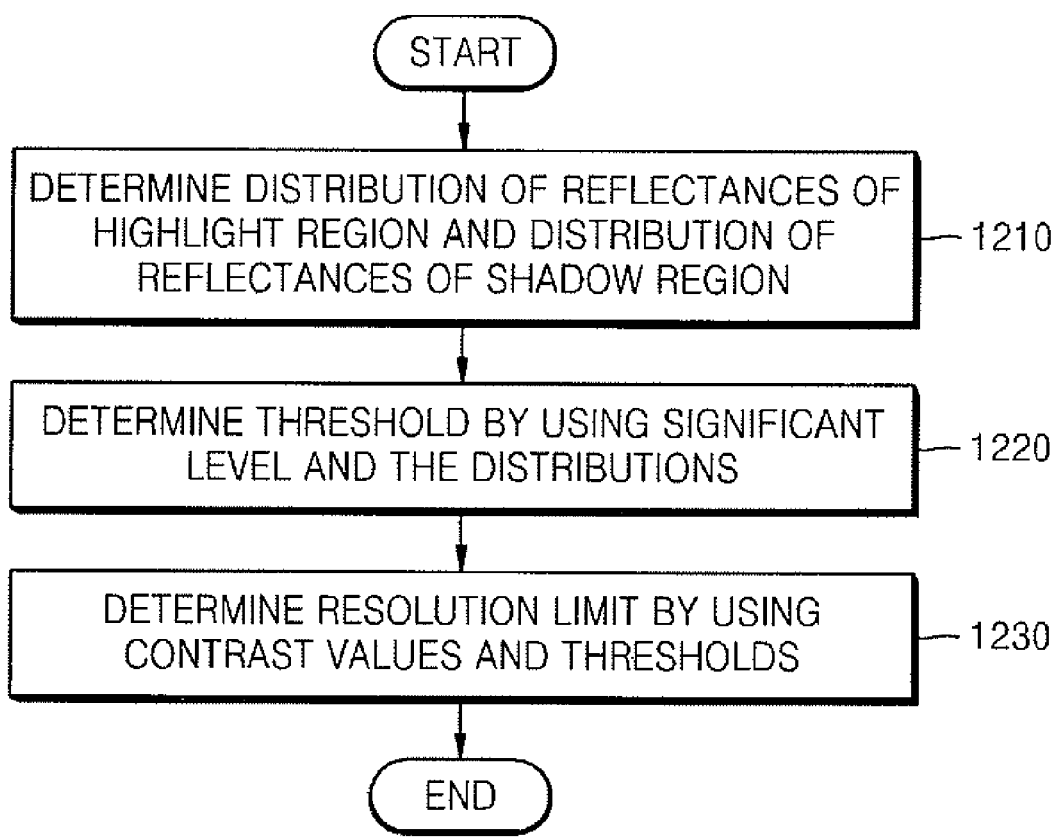
FIG. 12 is a flowchart of a method of determining an indicator of print quality according to an embodiment of the present general inventive concept.

FIG. 6 illustrates a detailed block diagram of an indicator determining unit 480A according to an embodiment of the present general inventive concept. Referring to FIG. 6, the indicator determining unit 480A includes a threshold determining unit 610 and a resolution limit determining unit 620. The indicator determining 480A is described below with reference FIG. 12 illustrating a flowchart of a method of determining an indicator according to an embodiment of the present general inventive concept.

The threshold determining unit 610 determines a distribution of the reflectance values of each of the pixels in the highlight region and the shadow region as sorted by the pixel classifier 460 (operation 1210), and may determine a threshold through a statistical analysis based on a given level of statistical significance and the distributions of reflectances. Here, the threshold determining unit 610, for example, calculates a threshold of the pattern corresponding to each print resolution of the printed pattern data. Consequently, the threshold corresponding to each contrast value calculated by the contrast determining unit 470 can be separately determined. The exemplary operations of calculating a threshold of a bar pattern corresponding to a particular resolution are described below, and the operations of calculating a threshold of a bar pattern corresponding to another resolution are performed similarly.

Figure 7:
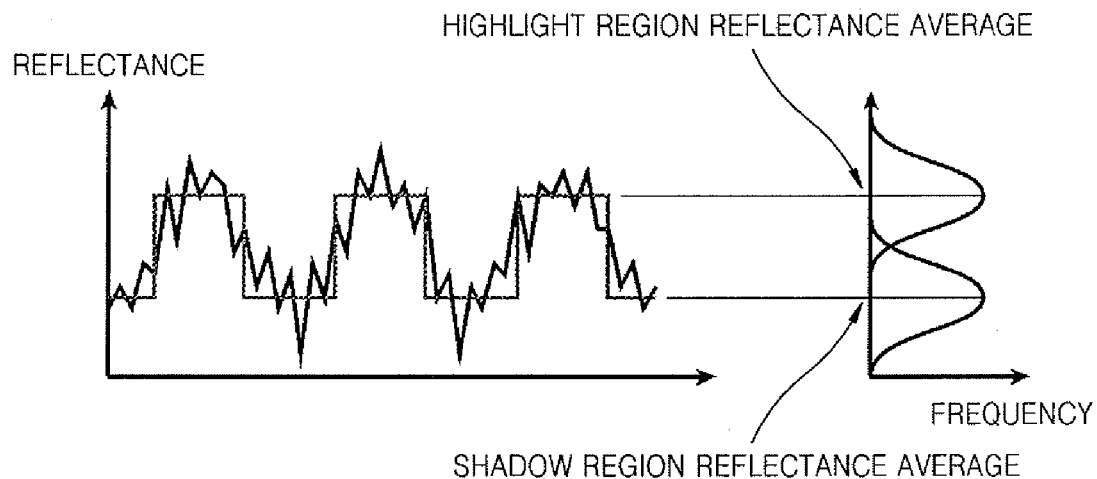
FIG. 7 illustrates a determination of a threshold according to an embodiment of the present general inventive concept.

Determining a threshold according to an embodiment of the present general inventive concept is described with reference to FIG. 7. The left side of FIG. 7 is a graph representing a change in measured reflectance according to a position of the corresponding pixel, and averages of reflectances of the highlight region and the shadow region. In addition, the right side of FIG. 7 is a graph representing a frequency distribution of the reflectances of each of the highlight region and the shadow region. As illustrated in the right graph of FIG. 7, when two distributions of reflectances are given, that is, a distribution of the reflectances of the highlight region and a distribution of the reflectances of the shadow region, a difference between the average values of the two distributions may exist to a statistical level of significance, and, if so, a threshold may be determined therefrom. A contrast value can be compared with the corresponding threshold to determine the maximum resolution at which the contrast value determined from a difference between highlight and shadow reflectance values remains statistically significant. A statistically significant difference between highlight and shadow reflectance values indicates that the difference is between averages of distinct distributions of reflectance values such that the corresponding contrast is present in the data. A contrast below the threshold would indicate that the difference in reflectance values is not from distinct distributions of reflectance values, and therefore the contrast is not present in the data. Setting the significance level thus determines an acceptable level of contrast between the highlight regions and the shadow regions of a dot pattern corresponding to a particular print resolution.

According to certain embodiments of the present general inventive concept, the variance $V_0$ of the reflectances of the shadow region and the variance $V_1$ of the reflectances of the highlight region are calculated by, for example, the following equations, respectively.

$$V_0 = \frac{1}{n_0 - 1} \sum_{i \in \Omega_0} (R(x_i, y_i) - \overline{R}_0)^2 \quad \text{[Equation 6]}$$

$$V_1 = \frac{1}{n_1 - 1} \sum_{j \in \Omega_1} (R(x_j, y_j) - \overline{R}_1)^2 \quad \text{[Equation 7]}$$

Here, R(x, y) denotes a reflectance value at the pixel coordinate (x, y), $\Omega_0$ denotes a set of pixels included in the shadow region, and $\Omega_1$ denotes a set of pixels included in the highlight region. In addition, $\overline{R}_0$ and $\overline{R}_1$ denote averages of reflectances of the shadow region and the highlight region, respectively.

A threshold Threshold ($\alpha$) can be calculated by using the following equation.

$$\text{Threshold}(\alpha) = 100 \cdot k \cdot f(n_0, n_1, V_0, V_1, \alpha) \quad \text{[Equation 8]}$$

Here, k is a constant, and may use a value obtained by Equation 5. In addition, $f(n_0,n_1,V_0,V_1,\alpha)$ is a statistical hypothesis test function associated with $n_0$, $n_1$, the variance $V_0$ of the reflectances of the shadow region, the variance $V_1$ of the reflectances of the highlight region, and a significant level $\alpha$.

The significant level a may be set as a default in the apparatus 430 to evaluate print quality, or may be input by a user. In certain embodiments of the present general inventive concept, the significant level $\alpha$ is a value in a range of 0.01 to 0.6.

The threshold Threshold ($\alpha$) may be determined by a Welch's test or a t-test function serving as the hypothesis test function $f(n_0,n_1,V_0,V_1,\alpha)$. When the Welch's test is performed, the threshold Threshold ($\alpha$) can be calculated by using the following equation.

$$\text{Threshold}(\alpha) = 100 \cdot k \cdot t(\phi^*, \alpha) \sqrt{\frac{V_0}{n_0} + \frac{V_1}{n_1}} \quad \text{[Equation 9]}$$

Here, $t(\phi^*,\alpha)$ denotes a t distribution, and $\phi^*$ is an equivalent degree of freedom and may be calculated using the following equation.

$$\phi^* = \frac{\left(\frac{V_0}{n_0} + \frac{V_1}{n_1}\right)^2}{\left(\frac{V_0}{n_0}\right)^2 / \phi_0 + \left(\frac{V_1}{n_1}\right)^2 / \phi_1} \quad \text{[Equation 10]}$$

Here, $\phi_0$ and $\phi_1$ denote $n_0-1$ and $n_1-1$, respectively.

When the t-test is performed, the threshold Threshold ($\alpha$) may be determined using the following equation.

$$\text{Threshold}(\alpha) = 100 \cdot k \cdot t(n_0 + n_1 - 2, \alpha) \quad \text{[Equation 11]}$$

$$\sqrt{\left(\frac{V_0(n_0 - 1) + V_1(n_1 - 1)}{n_0 + n_1 - 2}\right)\left(\frac{1}{n_0} + \frac{1}{n_1}\right)}$$

According to the current embodiment, unlike in a conventional method that uses a predetermined threshold to determine a resolution limit, a threshold is determined for each resolution value on the basis of the distribution of the reflectances of the highlight region and the distribution of the reflectances of the shadow region. The threshold determined according to the present general inventive concept can be used to indicate a mismatch of a print position, a change in print gradation, and a degree of mixing with noise components. A resolution limit determined as the maximum resolution at which the contrast value indicates a difference between highlight and shadow reflectance values that remains statistically significant as established by the threshold may be used as the indicator of print quality in the presence of the mismatch of the print position, the change in the print gradation, and the degree of mixing with noise components.

The resolution limit determining unit 620 determines the resolution limit, which may be used as the indicator of print quality, on the basis of the contrast values of a bar pattern corresponding to each resolution value determined by the contrast determining unit 470, and the thresholds of a bar pattern corresponding to each resolution value determined by the threshold determining unit 610 (operation 1230).

Figure 8:
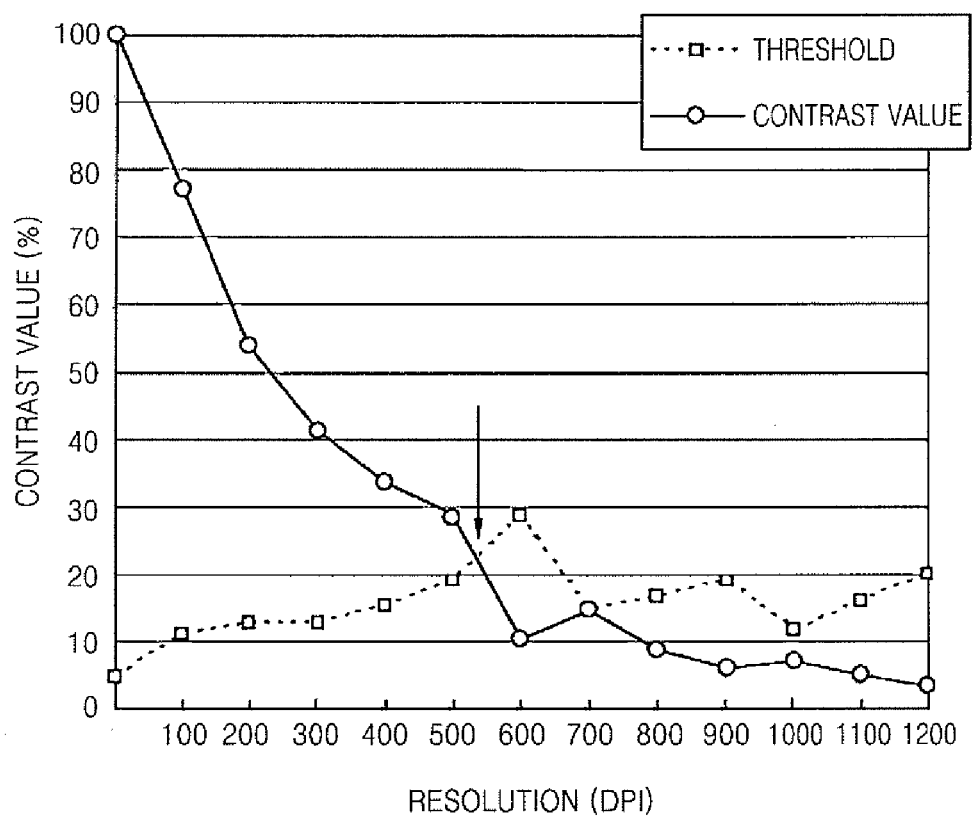
FIG. 8 is a graph illustrating exemplary contrast values and thresholds according to each resolution value.

Exemplary operations to determine the resolution limit are described in detail with reference to FIG. 8. FIG. 8 is a graph of contrast values and thresholds according to each resolution value. Referring to FIG. 8, at a point indicated by the arrow, a contrast value and a threshold are equivalent at a cross point of the plotted lines. The resolution limit determining unit 620 may determine a resolution value corresponding to the cross point as the resolution limit. The resolution limit in FIG. 8 is in a range of 500 DPI to 600 DPI. Here, the resolution limit can be calculated by using a linear interpolation from an array of the contrast values and the thresholds. In this case, when it is assumed that an integer i denotes an index of the array, C[i] denotes an i-th element in a contrast value array, T[i] denotes an i-th element in a threshold array, and DPI[i] denotes an i-th element of a resolution array, the resolution limit $DPI_{limit}$ can be calculated by using, for example, the following equation.

$$DPI_{limit} = \frac{DP1[i_0 - 1] \cdot (T[i_0] - C[i_0]) + DPI[i_0] \cdot (C[i_0 - 1] - T[i_0 - 1])}{(C[i_0 - 1] - T(i_0 - 1] + T[i_0] - C[i_0])}$$ [Equation 11]

Here, $i_0$ denotes a minimum index value obtained when C[i] becomes smaller than T[i].

Figure 9:
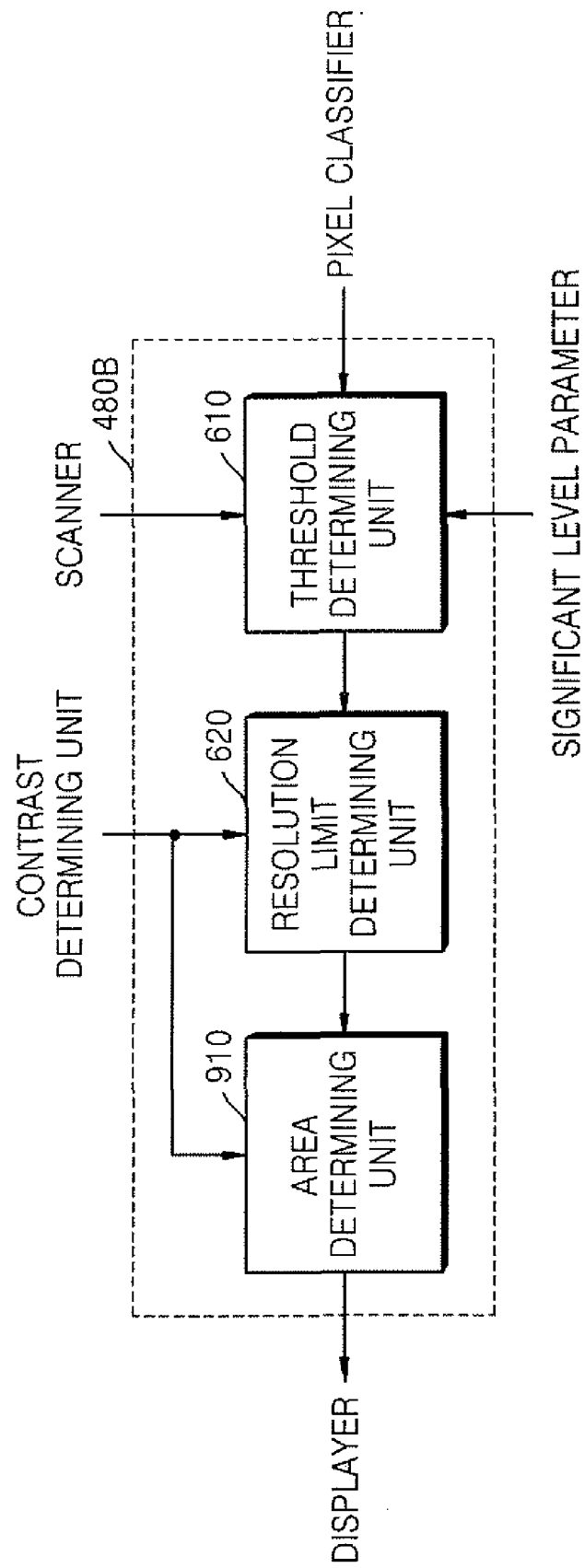
FIG. 9 is a detailed block diagram illustrating an indicator determining unit according to another embodiment of the present general inventive concept.
Figure 13:
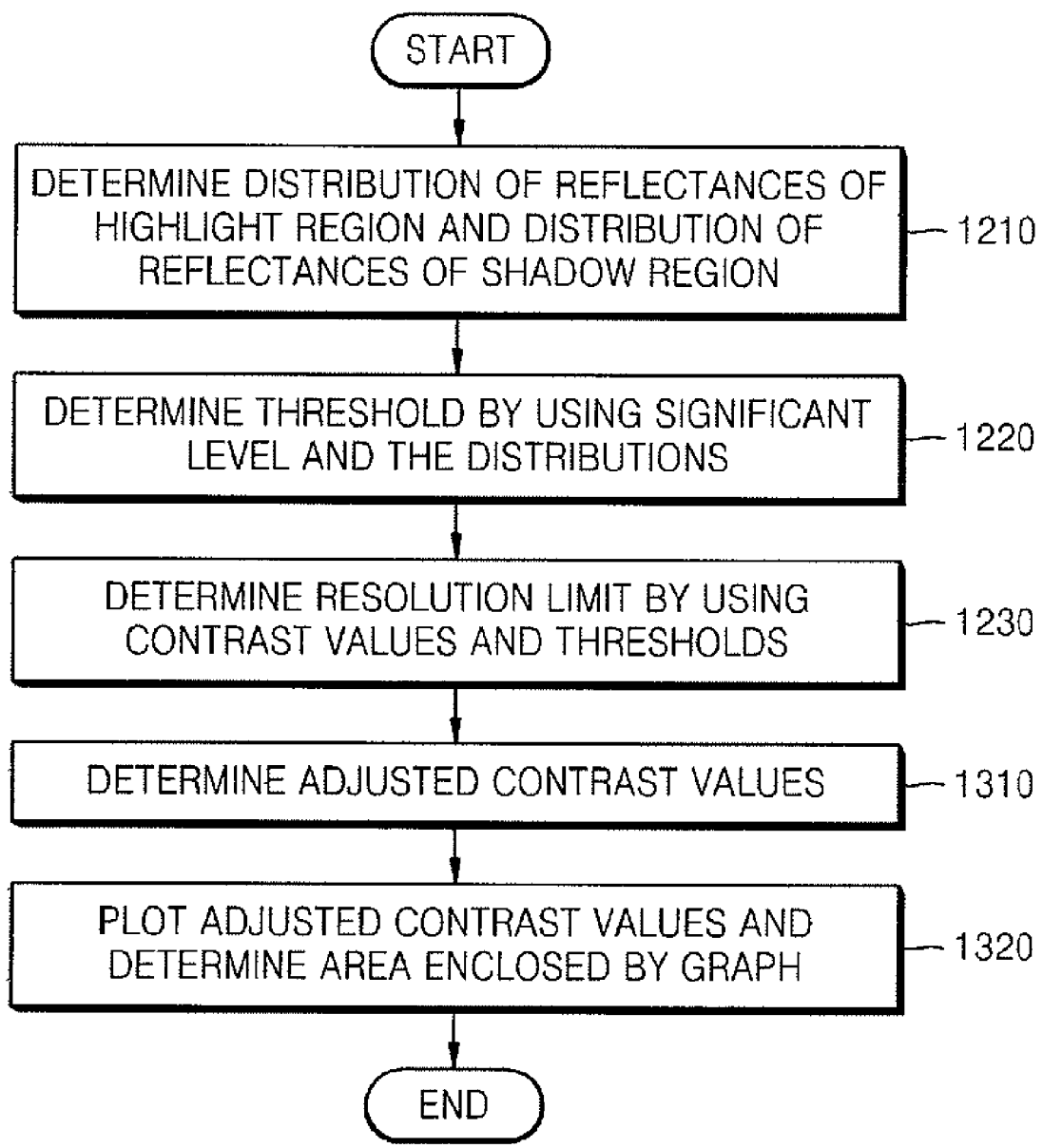
FIG. 13 is a flowchart of a method of determining an indicator of print quality according to another embodiment of the present general inventive concept.

FIG. 9 illustrates a detailed block diagram of an indicator determining unit 480B according to another embodiment of the present general inventive concept. Referring to FIG. 9, the indicator determining unit 480B includes a threshold determining unit 610, a resolution limit determining unit 620, and an area determining unit 910. The indicator determining unit 480B is described with reference to FIG. 13 illustrating a flowchart of a method of determining an indicator according to another embodiment of the present general inventive concept. The threshold determining unit 610, the resolution limit determining unit 620, and operations 1210 to 1230 have the same operations as those in the description associated with FIG. 6 to 12, and thus a detailed description thereof will be omitted.

After operation 1230, the area determining unit 910 may determine an adjusted contrast value, which is obtained by subtracting the contrast value corresponding to the resolution limit calculated by the resolution limit determining unit 620 from the contrast values of a bar pattern corresponding to each resolution value (operation 1310). Referring to FIG. 8, the contrast value corresponding to the resolution limit is about 23%. In addition, the area determining unit 910 may establish an axis at the resolution value and another axis at the adjusted contrast value and may plot adjusted contrast values per each resolution. An area enclosed by the resulting graph may be used as the indicator of print quality (operation 1320). A larger calculated area is indicative of higher print quality. It is to be understood, however, that the plotting of lines may be displayed on the displayer for purposes of analysis and visualization, but computations to arrive at the indicator values may be achieved without such plotting, such as by numerical integration.

Figure 10:
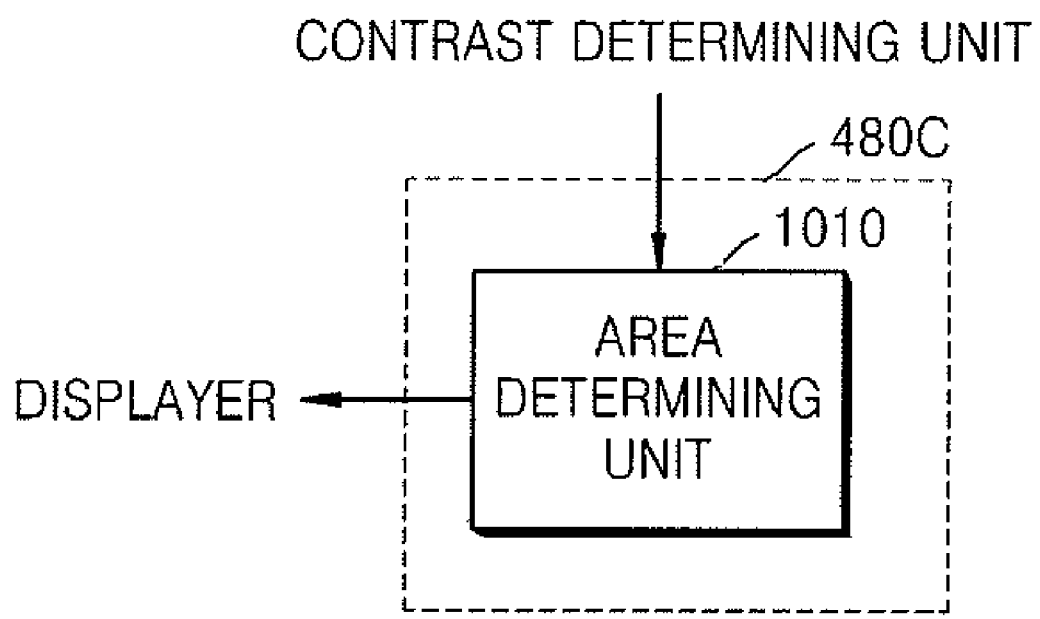
FIG. 10 is a detailed block diagram illustrating an indicator determining unit according to another embodiment of the present general inventive concept.
Figure 14:
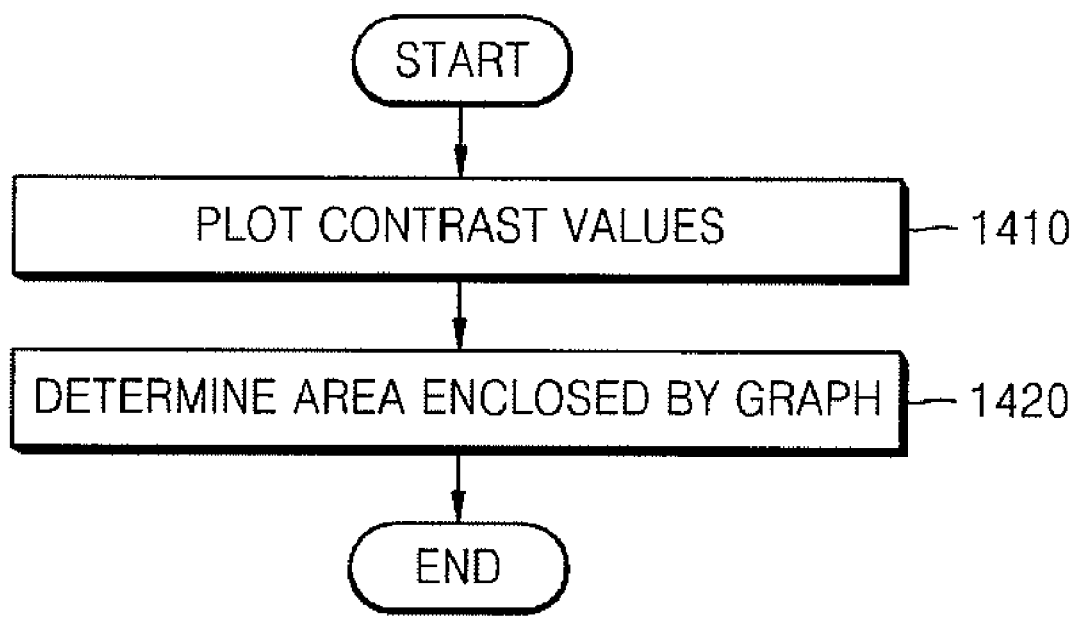
FIG. 14 is a flowchart of a method of determining an indicator of print quality according to another embodiment of the present general inventive concept.

FIG. 10 illustrates a detailed block diagram of an indicator determining unit 480C according to another embodiment of the present general inventive concept. Referring to FIG. 10, the indicator determining unit 480C includes an area determining unit 1010. The indicator determining unit 480C will now be described with reference to FIG. 14 illustrating a flowchart of a method of determining an indicator according to another embodiment of the present general inventive concept.

The area determining unit 1010 may integrate contrast values corresponding to each resolution calculated by the contrast determining unit 470 according to each resolution value (operation 1410), and establishes the integrated area as the indicator of print quality (operation 1420). Again, a larger calculated area indicates a higher print quality.

Accordingly, averages of reflectances of the highlight region and the shadow region of the pattern used to evaluate print quality are obtained, and a contrast value determined by using a difference between the averages is used to determine the indicator of print quality. Therefore, deterioration of print quality that occurs due to a mismatch of a print position is considered, and furthermore, a change in print gradation and a degree of mixing with noise components is also considered in evaluating print quality.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the medium.

It is to be understood that the computer-readable medium may be any medium on which the instructions may be encoded and then subsequently retrieved, decoded and executed by a processor, including electrical, magnetic and optical storage devices, and wired, wireless, optical and acoustical communication channels. The computer readable medium may include either or both of persistent storage, referred to herein as "computer-readable recording media" and as spatiotemporal storage, referred to herein as "computer-readable transmission media". Examples of computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The computer-readable recording media may be distributed across components, to include such distribution through storage systems interconnected through a communication network. The computer-readable transmission media may transmit encoded instructions on electromagnetic carrier waves or signals, or as acoustic signals through acoustically transmissive media. Moreover, the processor instructions may be derived from algorithmic constructions of the present general inventive concept in various programming languages, the mere contemplation of which illustrates the numerous realizable abstractions of the present general inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of evaluating print quality, the method comprising:
   measuring a reflectance of printed dots by scanning a medium on which the dots are printed according to pattern data of an ideal shading model having a predetermined pattern of a highlight region and a shadow region of at least one resolution;

classifying pixels of a scan image based on the measured reflectance as a highlight region or a shadow region, by mapping the scan image onto the ideal shading model;

determining an average of reflectances of the highlight region of the classified pixels in the predetermined pattern and an average of reflectances of the shadow region of the classified pixels thereof;

determining a contrast value from a difference between the average of the reflectances of the highlight region and the average of the reflectances of the shadow region; and determining an indicator of the print quality based on a resolution limit or an area obtained using the contrast value.

2. The method of claim 1, wherein the classifying of the pixels classifies the pixels respectively assigned a value corresponding to a reflectance of a corresponding one of the printed dots from the scanning thereof as corresponding to the printed dots in the highlight region or the shadow region of the predetermined pattern.

3. The method of claim 2, wherein the classifying of pixels further comprises:

determining a position of each of the pixels, the pixels being classified into the highlight region and the shadow region in the predetermined pattern on the basis of the position of each of the pixels.

4. The method of claim 2, wherein the classifying of the pixels further comprises:

mapping pixels of the scan image onto pixels of the ideal shading model.

5. The method of claim 1, wherein the contrast value is determined through machine computations of the following equations:

$$\bar{R}_0 = \frac{1}{n_0} \sum_{i \in \Omega_0} R(x_i, y_i);$$

$$\bar{R}_1 = \frac{1}{n_1} \sum_{j \in \Omega_1} R(x_j, y_j);$$

and $$C_t = k \cdot |\bar{R}_1 - \bar{R}_0| \cdot 100,$$

wherein, $\bar{R}_0$, $\bar{R}_1$, and $C_t$ respectively denote the average of reflectances of the shadow region, the average of reflectances of the highlight region, and the contrast value; $n_0$ and $n_1$ denote the numbers of pixels used to obtain the average of reflectances of the shadow region and the average of reflectances of the highlight region, respectively; R(x, y) denotes a reflectance assigned to the pixel at coordinates (x, y); $\Omega_0$ and $\Omega_1$ respectively denote a set of pixels included in the shadow region and a set of pixels included in the highlight region; and k is a constant.

6. The method of claim 1, wherein the predetermined pattern includes a plurality of bar patterns in which the highlight region and the shadow region have widths corresponding to a plurality of predetermined resolution values, the contrast values being determined from each of the bar patterns.

7. An apparatus to evaluate print quality, the apparatus comprising:

a scanner to obtain a reflectance of printed dots on a medium and to assign the reflectance to at least one pixel in a scan image, the dots printed according to pattern data of an ideal shading model having a predetermined pattern of a highlight region and a shadow region of at least one resolution;

a pixel classifier to classify pixels of a scan image based on the obtained reflectance into a highlight region or a shadow region, by mapping the ideal shading model and the scan image;

a contrast determining unit to determine an average of reflectances of the highlight region of the classified pixels in the predetermined pattern and an average of reflectances of the shadow region of the classified pixels thereof, and to determine a contrast value from a difference between the average of reflectances of the highlight region and the average of reflectances of the shadow region; and an indicator determining unit to determine an indicator of the print quality based on a resolution limit or an area obtained using the determined contrast value.

8. The apparatus of claim 7, further comprising:

a pixel classifier to classify the pixels as being from the highlight region or the shadow region of the predetermined pattern.

9. The apparatus of claim 8, further comprising:

a position determining unit to determine a position of each of the pixels in relation to a position of the corresponding dot in the predetermined pattern, wherein the pixel classifier classifies pixels as being from the highlight region or the shadow region in the predetermined pattern from the determined position of each of the pixels.

10. The apparatus of claim 8, wherein the pixel classifier classifies the pixels into the highlight region and the shadow region of the predetermined pattern by mapping pixels of the scan image based on the measured reflectance onto pixels of the ideal shading model.

11. The apparatus of claim 7, wherein the contrast value is determined through machine computations of the following equations:

$$\bar{R}_0 = \frac{1}{n_0} \sum_{i \in \Omega_0} R(x_i, y_i);$$

$$\bar{R}_1 = \frac{1}{n_1} \sum_{j \in \Omega_1} R(x_j, y_j);$$

and $$C_t = k \cdot |\bar{R}_1 - \bar{R}_0| \cdot 100,$$

wherein, $\bar{R}_0$, $\bar{R}_1$, and $C_t$ respectively denote the average of reflectances of the shadow region, the average of reflectances of the highlight region, and the contrast value; $n_0$ and $n_1$ denotes the numbers of pixels used to obtain the averages, respectively; R(x, y) denotes a reflectance assigned to the pixel at coordinates (x, y); $\Omega_0$ and $\Omega_1$ respectively denote a set of pixels included in the shadow region and a set of pixels included in the highlight region; and k is a constant.

12. The apparatus of claim 7, wherein the predetermined pattern includes a plurality of bar patterns in which the highlight region and the shadow region have widths corresponding to a plurality of predetermined resolution values, the contrast determining unit determining the contrast values corresponding to each of the bar patterns.

* * * * *